No. 700,892. Patented May 27, 1902.
C. B. BLACKBURN & G. J. PORTER.
TAP FOR CUTTING SCREW THREADS.
(Application filed Jan. 8, 1902.)
(No Model.)
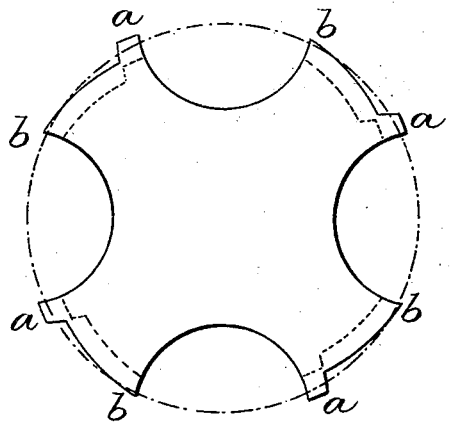
Fig. 1.
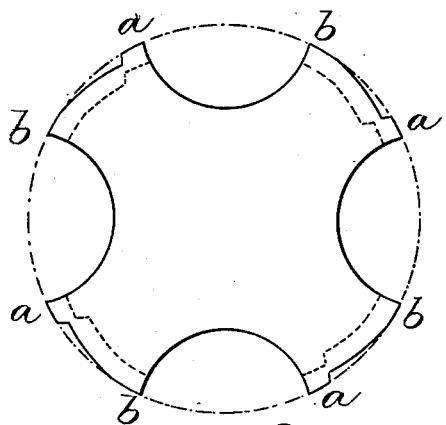
Fig. 2.
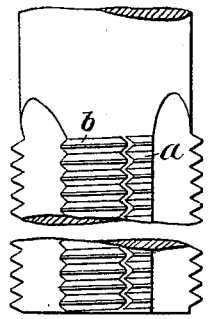
Fig. 4.
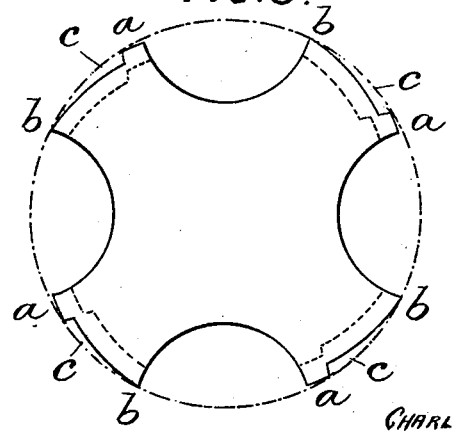
Fig. 3.
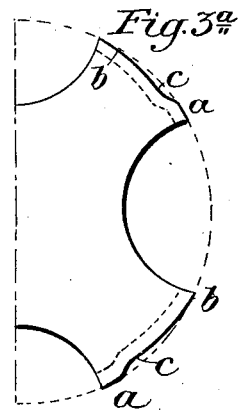
Fig. 3ª.
WITNESSES:
F. W. Wright
J. C. Connor
INVENTORS
CHARLES BERWICKE BLACKBURN
GEORGE JAMES PORTER
BY Howson and Howson
HIS ATTORNEYS.

UNITED STATES PATENT OFFICE.

CHARLES BEWICKE BLACKBURN AND GEORGE JAMES PORTER, OF WOLVERHAMPTON, ENGLAND.

TAP FOR CUTTING SCREW-THREADS.

SPECIFICATION forming part of Letters Patent No. 700,892, dated May 27, 1902.

Application filed January 8, 1902. Serial No. 88,874. (No model.)

*To all whom it may concern:*

Be it known that we, CHARLES BEWICKE BLACKBURN, engineer, residing at New Oxley, Wolverhampton, and GEORGE JAMES PORTER, foreman tool-maker, residing at 17ª Gibb street, Wolverhampton, in the county of Stafford, England, subjects of the King of Great Britain and Ireland, have invented certain new and useful Improvements in Taps for Cutting Screw-Threads; and we do hereby declare the following to be a full, clear, and exact description of the invention, such as will enable others skilled in the art to which it appertains to make and use the same.

This invention consists of an improved tap for cutting internal screw-threads, the object being to reduce friction and also to prevent clogging and breakage of the tap during withdrawal. The simple tap in ordinary use, consisting of a steel screw with longitudinal flutes, has a full thread in the portions not fluted, absorbs considerable power in the act of cutting, and in order to reduce this it is common practice to make the leading or cutting edge most prominent, the thread instead of being concentric with the axis of the tap being cut eccentrically, and thus gradually sunk to a reduced diameter. This is technically termed a "relieved" or "backed-off" thread. This form, however, has the disadvantage that there is clogging during the withdrawal of the tap from the work, and consequently the thread which is being cut is frequently spoiled and the thread of the tap broken off. Another method proposed for the purpose of obviating this objection has been to cut away the crown or point of the thread from the leading or cutting edge and the rear or non-cutting edge. We have found better results can be obtained if, starting from the cutting edge, the thread be backed off for a certain distance only, so that the rear portion is left the full original size, or very nearly so, and the leading edge is also left the full size, but the thread being backed off in the intermediate portion. The result is that when the tap is rotated in the work to be operated on so as to travel inward the relief given to the cutting edge reduces the power required, while during the withdrawal of the tap from the work clogging is prevented in consequence of the rear portion of the thread being left the full or nearly the full diameter, and thus closing the passage by which the debris which collects in the flute could otherwise reach the recess formed by backing off a portion of the thread, and so cause clogging or choking.

In the accompanying drawings, Figures 1, 2, and 3 show the end of a tap in different stages of its shaping, as hereinafter described. Fig. 3ª is a modification. Fig. 4 is a side elevation of a tap constructed according to our invention.

In constructing a plug-tap according to this invention a screw-thread is cut on a cylinder of steel, which is then fluted in the usual way. The thread thus formed is then backed off or relieved for only a certain portion of its length. This operation can conveniently be carried out on a lathe fitted with the known backing-off apparatus used in tool-shops, which operates automatically to withdraw the cutting-tool or chaser a little before the flute is reached, thus leaving the thread slightly higher at the heel or back portion than it is at the front, as shown at *a* in the end view, Fig. 1. The next operation is to reduce the heel or rear portions *a* of the threads to the same or a slightly-smaller diameter than that of the leading or cutting edge *b*. This can be done by passing the tap through a finishing-die or by chasing it, which will leave the heel or rear portions *a* and cutting edges *b* the same diameter as shown in Fig. 2. Where the work to be tapped is hard or tough, it is found better to reduce the heel or rear portions to a diameter slightly less than that of the cutting edge, and this is done by actuating the tool or chaser by the backing-off apparatus, so that it is thrust forward when it is opposite the heel or rear portions and withdrawn when it is opposite the cutting edge. In the latter case of a tap with the heel reduced to a diameter slightly less than that of the cutting edge it is immaterial for the proper action of the tap whether the rear portion maintains its concentricity or is slightly relieved, as shown in Fig. 3; but where the operation is carried out in a backing-off lathe it follows as a necessity that the rear edge is so relieved, but the length of the portion so relieved is so short that the amount it differs from concentricity is practically negligible. Similarly it is immaterial whether the portion of the circumference cut away by the fluting be greater or less than portions occupied by the thread; but if the operation be carried out on a backing-off lathe the latter is necessarily the least, as the rotation of the lathe causes the chaser to advance and retreat automatically in the space occupied by the flute before the rotation brings the next series of teeth opposite the chaser, and if the flute were too narrow the chaser would foul.

In forming a tapered tap a plug-tap is first of all made according to the above description and tapered in the ordinary way without the backing-off motion. The flat tops of the teeth thus formed are then backed off with a plain tool. This leaves the teeth with flat tops slightly higher at the heel or rear portions than at the cutting edges. The heel or rear portions are then reduced to the same or slightly less diameter than the cutting edges either by turning off without employing the backing-off motion when it is required to be of the same diameter or when it is required to be of a smaller diameter by the operation above described for reducing the heel or rear portions of the threads with the backing-off apparatus, a plain tool being used instead of a chaser.

In the form illustrated the thread has the appearance of being stepped; but we may graduate the step so as to form a continuous curve or wave line, as indicated by the lines $c$ in Fig. $3^a$. This can conveniently be produced either in a backing-off lathe, with the cams actuating the backing-off motion, so modified that the tool or chaser is gradually instead of suddenly withdrawn, or in an ordinary lathe with a tool to which a suitable reciprocating motion is imparted by gearing in any known or suitable way.

We claim as our invention—

The herein-described tap provided with threaded portions separated by flutings, each threaded portion having a cutting edge and a heel, the threads being "backed off" toward the heel and said heel parts being of substantially the same diameter as the cutting-edge parts, as and for the purpose set forth.

In testimony whereof we have affixed our signatures in presence of two witnesses.

CHARLES BEWICKE BLACKBURN.
GEORGE JAMES PORTER.

Witnesses:
JOSEPH EDMUND SADLER,
THOMAS HENRY CORFIELD.